United States Patent
Kaiser et al.

(10) Patent No.: US 10,104,525 B1
(45) Date of Patent: Oct. 16, 2018

(54) NFC-ENABLED SYSTEMS, METHODS AND DEVICES FOR WIRELESS VEHICLE COMMUNICATION

(71) Applicant: GM GLOBAL TECHNOLOGY OPERATIONS LLC, Detroit, MI (US)

(72) Inventors: Craig Kaiser, Lancaster, NY (US); Donald K. Grimm, Utica, MI (US); Timothy J. Talty, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/658,182

(22) Filed: Jul. 24, 2017

(51) Int. Cl.
*H04W 4/80* (2018.01)
*H04B 5/00* (2006.01)
*H04L 29/08* (2006.01)

(52) U.S. Cl.
CPC ............ *H04W 4/80* (2018.02); *H04B 5/0031* (2013.01); *H04L 67/12* (2013.01); *H04L 67/141* (2013.01)

(58) Field of Classification Search
CPC .................................................... H04B 1/3822
See application file for complete search history.

(56) References Cited

U.S. PATENT DOCUMENTS

| | | | |
|---|---|---|---|
| 8,880,240 B2 | 11/2014 | Grimm et al. | |
| 9,021,049 B2 | 4/2015 | Bai et al. | |
| 2002/0128923 A1* | 9/2002 | Dale | G06F 17/30876 705/26.1 |
| 2008/0113655 A1* | 5/2008 | Angelhag | H04L 67/16 455/414.2 |
| 2009/0066488 A1 | 3/2009 | Wang et al. | |
| 2009/0193500 A1* | 7/2009 | Griffin | G06Q 20/10 726/2 |
| 2011/0136429 A1 | 6/2011 | Ames et al. | |
| 2013/0103779 A1 | 4/2013 | Bai et al. | |
| 2014/0240089 A1* | 8/2014 | Chang | G07C 9/00111 340/5.61 |
| 2015/0181306 A1 | 6/2015 | Innes et al. | |
| 2016/0019651 A1 | 1/2016 | Grimm et al. | |
| 2016/0044519 A1 | 2/2016 | Bai et al. | |

* cited by examiner

*Primary Examiner* — Hsin-Chun Liao
(74) *Attorney, Agent, or Firm* — Quinn IP Law (57) ABSTRACT

Disclosed are NFC-enabled communication systems for provisioning wireless vehicle communication, control logic for operating such systems, and motor vehicles equipped with an onboard NFC-enabled device for short-range communication with one or more off-board NFC-enabled devices. A disclosed method for provisioning data exchange between an onboard electronic device of a motor vehicle and an off-board electronic device includes detecting if NFC-enabled components of the onboard and off-board electronic devices are within a predetermined proximity of each other and, if the components are within proximity, establishing a wireless communications session between the devices. After establishing the wireless communications session, determining whether or not to grant the off-board electronic device access to an NFC tag in the NFC-enabled component of the onboard electronic device. If access to the NFC tag is granted, a message data packet is transmitted from the off-board electronic device to the onboard electronic device or a personal computing device.

20 Claims, 3 Drawing Sheets

NFC-ENABLED SYSTEMS, METHODS AND DEVICES FOR WIRELESS VEHICLE COMMUNICATION

INTRODUCTION

The present disclosure relates generally to onboard electronic systems for providing wireless communication capabilities to a motor vehicle. More specifically, aspects of this disclosure relate to systems, methods and devices for establishing a wireless communication session between a smartphone, tablet computer, or other portable electronic device and a motor vehicle using Near Field Communication protocols.

Current production motor vehicles, such as the modern-day automobile, are originally equipped or retrofit with various types of onboard communication devices for transferring information to and from vehicle occupants. In automotive applications, for example, passenger cars are outfitted with an instrument cluster that communicates information to the driver regarding such things as vehicle speed, engine speed, fuel level, engine conditions, and other vehicle-related data. In addition to the instrument cluster, most automobiles include as standard equipment an onboard audio system that operates alone or in conjunction with peripheral hardware to play music, output navigation instructions, receive voice commands, or provide other audio related functionality. Some motor vehicles are now equipped with a graphical user interface, such as a touchscreen video display panel, that is positioned in a center stack of the passenger compartment and is operable to receive user inputs and display image, text, and video-based content. In-vehicle audiovisual (AV) hardware that delivers entertainment and informational content is collectively referred to in the art as an integrated "infotainment" system.

Onboard vehicle devices may communicate content that is based, for example, on data received from a local device, such as a networked vehicle controller, smartphone, laptop, or digital audio file player, as well as data received from a remote device, such as a radio transmitter, GPS navigation transceiver, or satellite broadcast service. Some devices are even able to receive data from a distributed computer network—the most ubiquitous being the global Internet—over a wireless fidelity (WiFi) system, cellular network, or other wireless data exchange technology. Content that is output based on data received over a wireless network may include, for example, video (e.g., streaming television, movies, video clips, etc.), audio (e.g., Internet radio, podcasts, audio books, etc.), print media, social media, mobile phone media, and innumerable other types of information. Many vehicles now support seamless integration of a smartphone with the vehicles' infotainment systems, which allows occupants to access email, the World Wide Web, and, of course, use as a phone.

Wireless communication capabilities have become increasingly common in modern vehicles, enabling in-vehicle devices to interact with off-board devices in a variety of ways. Among the available wireless technologies, Near Field Communication (NFC) is a standardized set of communication protocols that enables two electronic devices to establish an encrypted communication channel through electromagnetic induction by bringing them within a predefined distance of each other, typically 20 cm (7.9 in) or less. There are two primary types of NFC-enabled devices: a passive device, such as an NFC tag, contains information that other devices can read/write but cannot itself read information; and an active device, such as a smartphone, that can store, read, write and send information. Whereas cellular technologies employ long-range radio signals to transmit data multiple miles from the confines of a host vehicle, NFC signal range is very limited, making it infeasible for NFC signals to be intercepted or manipulated by a device which is not physically located in very close proximity to the host vehicle.

SUMMARY

Disclosed herein are NFC-enabled communication systems and related control logic for provisioning wireless vehicle communication, methods for making and methods for operating such systems, and motor vehicles equipped with an onboard NFC-enabled device for short-range communication with off-board NFC-enabled devices. By way of example, and not limitation, there is presented an automobile with NFC communication capabilities that employ one or more NFC tags to enable messaging for vehicle users. As a non-limiting example, an in-vehicle NFC-enabled transceiver communicates with the NFC-enabled handheld device of a registered or an unregistered user to anonymously leave an electronic note or instant message for/by the vehicle owner (e.g., parking warning, social networking, car rental data, etc.). In addition, or alternatively, the vehicle's NFC transceiver uses NFC tags to enable off-board devices to leave/receive messages without the need for cellular, WiFi, or Bluetooth® connectivity. The NFC-enabled communication system may use an NFC gateway to communicate with any NFC-enabled electronic device, such as mobile phones, laptop and tablet computers, cloud storage, networked computing appliances, etc.

Attendant benefits for at least some of the disclosed concepts include simplified, low-cost and secure wireless systems for short-range vehicle communication between one or more onboard devices (e.g., those installed within, mounted to, or otherwise borne by a vehicle) and one or more off-board devices (e.g., those external to and not physically coupled with the vehicle). Some of the disclosed NFC architectures enable device-to-device messaging without requiring a dedicated software application be installed on the third-party device. Other attendant benefits may include anonymous messaging to and from a vehicle occupant, as well as password-protected and encrypted NFC communication features. Aspects of the disclosed concepts also help to eliminate the need for cellular, WiFi and Bluetooth® communications hardware, which may be less secure and less reliable than an NFC-enabled communications system.

Aspects of the present disclosure are directed to control logic and computer-executable algorithms for governing operation of an in-vehicle NFC-enabled communications system. Disclosed, for example, is a method for provisioning data exchange between an onboard electronic device of a motor vehicle and an off-board electronic device external to the motor vehicle. Both the onboard and off-board devices include a respective NFC-enabled component (passive or active). The method includes, in any order and in any combination with any features presented in this disclosure, detecting if the NFC-enabled components of the onboard and off-board devices are within a predetermined proximity of each other (e.g., 10 cm or less) and, if these NFC-enabled components are within the predetermined proximity, establishing a wireless communications session between the onboard and off-board electronic devices. After establishing a wireless communications session, a vehicle controller of the motor vehicle determines whether or not to grant the off-board electronic device access to an NFC tag in the NFC-enabled component of the onboard electronic device. Responsive to a determination to grant the off-board electronic device access to the NFC tag, communicating a message data packet from the off-board electronic device to the onboard electronic device or to a personal computing device of an owner or occupant of the vehicle.

Other aspects of the present disclosure are directed to motor vehicles equipped with an NFC-enabled communications system. A "motor vehicle," as used herein, may include any relevant vehicle platform, such as passenger vehicles (internal combustion engine, hybrid electric, full electric, fuel cell, fuel cell hybrid, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body, and an onboard electronic device mounted to or otherwise supported on the vehicle body. The onboard device includes an NFC-enabled component with an NFC tag. This NFC-enabled component may detect and establish a wireless communication session with an NFC-enabled component of an off-board electronic device that is within a predetermined proximity of the NFC-enabled component of the onboard electronic device. Brokering a wireless communications session may first require establishing that an NFC-interfacing property (e.g., operable through a TagTech, NfcA, NfcB, NfcF, IsoDep, or Ndef object) of the off-board device's NFC-enabled component is active.

Continuing with the above example, the motor vehicle also includes a vehicle controller that is attached to the vehicle body and communicatively connected to the vehicle's NFC-enabled onboard electronic device. The vehicle controller, which may be in the nature of a programmable electronic control unit (ECU) or communications control module, executes memory stored instructions to determine whether or not to grant the off-board electronic device access to data stored by the NFC tag in the NFC-enabled component of the onboard electronic device. If access to the NFC tag is granted to the off-board electronic device, the vehicle controller may transmit to a user of the motor vehicle a message data packet received from the off-board electronic device. The NFC tag may be pre-loaded with a unique web Uniform Resource Locator (URL); if access is granted to the off-board electronic device, the unique web URL is transmitted from the NFC tag to the NFC-enabled component of the off-board electronic device. Transmitting the unique web URL may include contemporaneously transmitting an embedded command to automatically open the unique web URL in a web browser application on the off-board electronic device. Optionally, a user of the off-board electronic device may be prompted to open the unique web URL in the web browser application.

Additional aspects of the present disclosure are directed to non-transitory, computer readable media storing instructions executable by at least one of one or more processors of one or more in-vehicle electronic control units. These instructions, when executed, cause the ECU(s) to perform various operations, which may include any of the above or below disclosed methods, algorithms, and control logic. Disclosed systems, methods, CRM, and devices are available for vehicle-to-vehicle (V2V), vehicle-to-infrastructure (V2I), Vehicle-to-Pedestrian (V2P), Vehicle-to-device (V2D), and/or Vehicle-to-grid (V2G) applications.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of illustrative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are to be considered an exemplification of the disclosed principles and do not limit the broad aspects of the disclosure to the representative embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" and synonyms thereof mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Aspects of the disclosed concepts are directed to NFC-enabled vehicle communications systems that employ onboard NFC tags to facilitate, for example, anonymous instant messaging to a vehicle driver, owner, or occupant (Text Tag) or to facilitate a third party to leave and/or receive messages without the need of a cellular connection (Note Pad). Aspects of the present disclosure are directed to simplified, low-cost and secure wireless systems for short-range vehicle communication that help to enable messaging applications without requiring prior software/applications be installed on the third party's smart device (e.g., handheld tablet computer or smartphone). These messaging features may be password protected and encrypted to help ensure secure data exchange. Disclosed NFC-enabled communication systems may use an NFC gateway to communicate with any NFC-enabled electronic device, such as mobile phones, laptop and tablet computers, cloud storage, networked computing appliances, etc., whether passive or active, and whether reader, writer, read/write capable, and the like.

Figure 1:
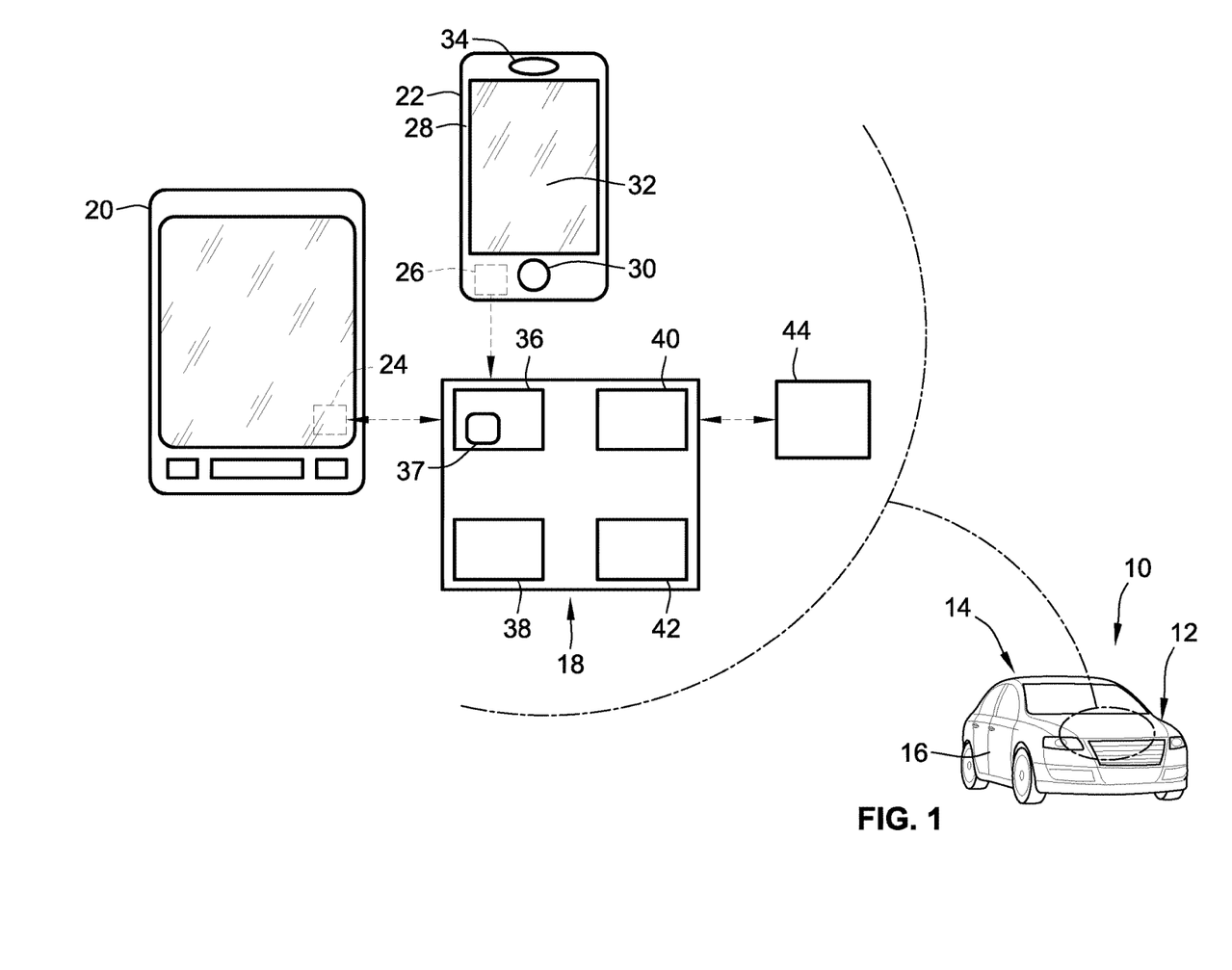
FIG. 1 is a front perspective-view illustration of a representative motor vehicle with an inset schematic illustration of a representative wireless communications human machine interface (HMI) architecture in accord with aspects of the disclosed concepts.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door sedan-style passenger vehicle. Mounted to the body 12 of the automobile 10, e.g., within a center stack of a passenger compartment 14 or on an outer panel or glass of a vehicle door assembly 16, are the various components of an NFC-enabled HMI 18. The illustrated automobile 10—also referred to herein as "motor vehicle" or "vehicle" for short—is merely an exemplary application with which novel aspects and features of this disclosure may be practiced. In the same vein, implementation of the present concepts into a center console HMI with a door-mounted NFC transceiver should also be appreciated as an exemplary application of the novel concepts disclosed herein. As such, it will be understood that aspects and features of the present disclosure may be applied to other NFC-enabled devices, incorporated into different HMI configurations, and implemented for any logically relevant type of motor vehicle. Lastly, the drawings presented herein are not necessarily to scale and are provided purely for instructional purposes. Thus, the specific and relative dimensions shown in the drawings are not to be construed as limiting.

Inset within FIG. 1 is a block diagram of an NFC-enabled HMI architecture 18 for provisioning short-range data exchanges between the vehicle 10 and one or more handheld NFC-enabled portable electronic devices 20 and 22 external to the vehicle 10. According to the illustrated example, a pedestrian, a law enforcement officer, or any other third party entity communicates with the vehicle's NFC-enabled HMI 18 (representative herein of an "onboard electronic device") using an NFC-enabled tablet computer 20 or an NFC-enabled smartphone 22 (e.g., representative herein of an "off-board electronic device"). By portable, it is meant that each device can be comfortably held in the hand or hands of one adult human and weighs less than a pound to a few pounds. These devices provide wireless and contactless communication via a built-in electronic chip or tag 24 and 26, respectively, using Near Field Communication technology. Operating, for example, at 13.56 megahertz (MHz; 13.56×106 cycles/sec), and transferring data at up to 424 Kilo-bits per second, NFC provides intuitive, simple, and reliable communication between electronic devices. NFC allows for both a "read" and "write" technology. Communication between two NFC-compatible devices occurs when they are brought within, for example, about two to four centimeters of one another.

With continuing reference to FIG. 1, each portable electronic device 20, 22 is fabricated with a discrete housing or casing 28, and includes one or more input devices 30, which may include various devices such as a keyboard, a single button, buttons on a button panel, a touchscreen, a track ball, a track pad, a microphone, or voice and/or gesture recognition software and hardware. For output, the portable electronic device 20, 22 may include, in a few examples, a display device 32, which may include a high-resolution liquid crystal display (LCD) panel, a plasma display, or a light emitting diode (LED) or organic LED (OLED) display, one or more speakers 34, one or more user-accessible ports (e.g., an audio output jack for headphones, a video headset jack, etc.), and other available I/O devices and ports. The primary display device 32 may be configured to display aspects of a wireless communications software, which may take on the form of a dedicated mobile software application (or "app"), as well as other tangential features, functions and information, such as text messaging, emails, alerts and announcements, personal information, advertisements, and the operating status of the portable electronic device 20, 22. To support ease of portability, each device may also be provided with a rechargeable battery, such as a 3.75V 4600 mAh/17.25 Wh lithium-polymer or lithium-ion battery, or other onboard source of power.

Vehicle 10 of FIG. 1 is equipped with an NFC-enabled component 36, which may be in the nature of an NFC tag, an NFC reader, an NFC reader-writer, whether passive or active, to wirelessly transmit vehicle information to either the tablet computer 20, smartphone 22, or other proximally located NFC-enabled device. In accord with the illustrated example, NFC-enabled component 36 utilizes an NFC tag 37 comprising a housing, an integrated circuit (IC) chip carried by the housing, and a data store with readable and, optionally, writable capacity. The tag's IC is generally configured for magnetic field (MF) induction to enable short-range data exchanges. While it is envisioned that an NFC tag may be packaged at any location of the vehicle body 12, tag 37 of FIG. 1 is mounted on an interior surface of an outer panel of vehicle door assembly 16, e.g., by a stick-on decal, a dedicated mounting bracket, designed into a component that mounts to the door panel, or any other suitable mounting technique. The NFC tag 37 may be a read-only tag that is encoded with an encryption key, vehicle and/or owner information specific to the host-vehicle, a pass code, or other information. Acting entirely stand-alone, the tag 37 does not require a power supply or a data connection to the vehicle 10, and it may act as a transponder by echoing back an encoded encryption key when queried by an NFC reading device. When an NFC tag is used, a user passes an NFC enabled reader/writer device near the NFC tag. A small amount of power is taken by the NFC tag from the reader/writer device to power the tag electronics. The tag is then enabled to transfer a small amount of information to the reader/writer device.

The HMI system 18 can store vehicle and driver information in resident memory 38 and, optionally, store/access such data via remote memory or cloud computing resources, schematically illustrated at 44, for use as appropriate. NFC-enabled HMI system 18 may also be equipped with a secondary wireless transceiver 40, such as a Dedicated Short Range Communications (DSRC) radio, for wirelessly communicating with public or private infrastructure. The DSRC transceiver may be provided as standard equipment to allow the vehicle 10 to take advantage of Intelligent Transportation System (ITS) capabilities. A DSRC radio can communicate with any entity that has DSRC communications capability or is operatively connected to DSRC infrastructure, including both public services and private enterprises. In accord with the illustrated example, the wireless transceiver could be a Wi-Fi radio, Bluetooth® component, a cellular antenna or some other form of wireless communication. A vehicle controller, such as communications electronic control unit (ECU) 42 of FIG. 1, is operable for governing operation of the HMI 18. In FIG. 1, the dashed arrows interconnecting the various illustrated components are emblematic of electronic signals or other communication exchanges by which data and/or control commands are transmitted from one component to the other.

Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.)), whether resident, remote or a combination of both, executing one or more software or firmware programs or routines, combinational logic circuit (s), input/output circuit(s) and devices, appropriate signal conditioning and buffer circuitry, and other components to provide the described functionality. Software, firmware, programs, instructions, routines, code, algorithms and similar terms may be defined to mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at in real-time, continuously, systematically, sporadically and/or at regular intervals, for example, each 100 microseconds, 3.125, 6.25, 12.5, 25 and 100 milliseconds, etc., during ongoing vehicle use or operation. Alternatively, routines may be executed in response to occurrence of an event.

Figure 2:
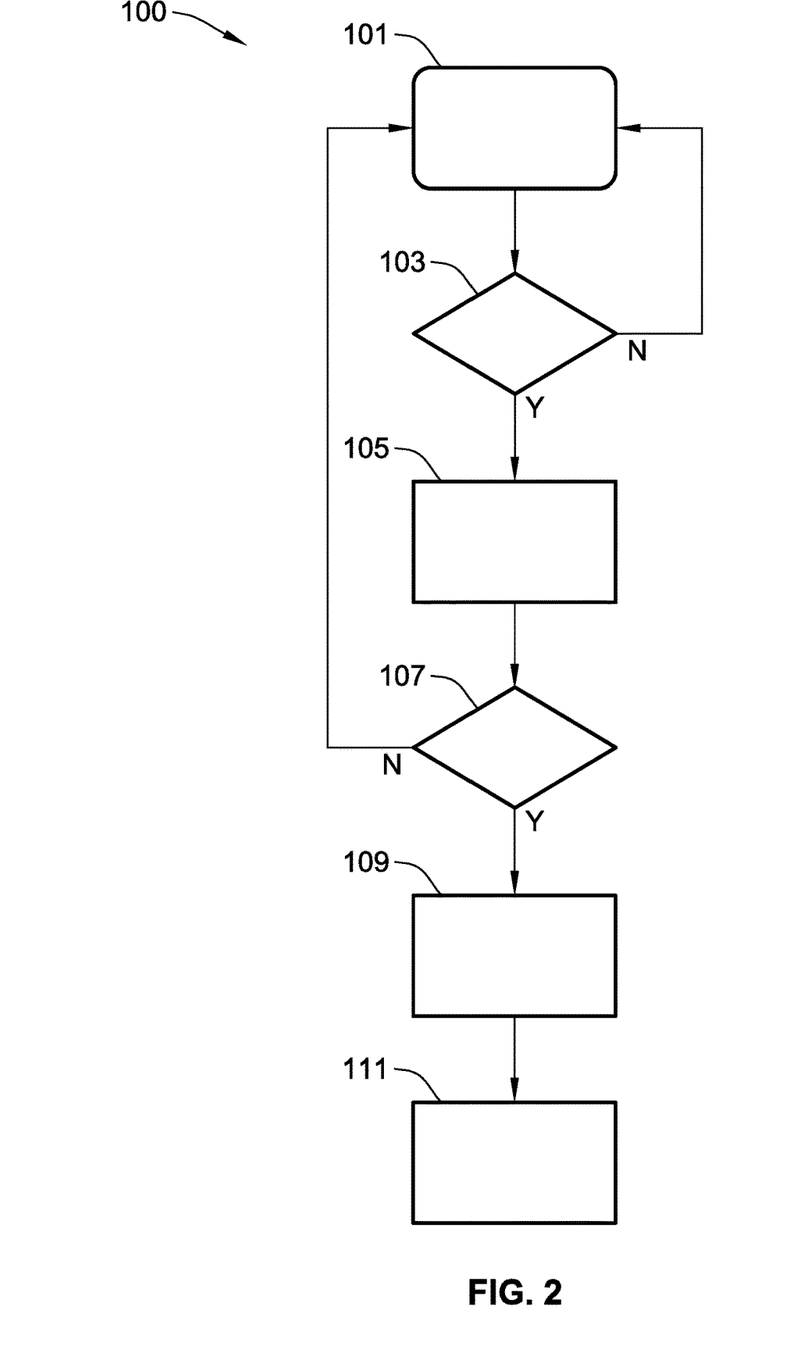
FIG. 2 is a flowchart for a representative NFC text tag communications protocol or algorithm that may correspond to memory-stored instructions executed by onboard control-logic circuitry, programmable electronic control unit, or other computer-based device of a motor vehicle in accord with aspects of the disclosed concepts.

With reference now to the flow chart of FIG. 2, an improved method or control strategy for provisioning data exchange between an NFC-enabled onboard electronic device, such as HMI 18 of vehicle 10 in FIG. 1, and an NFC-enabled off-board electronic device, such as portable electronic devices 20, 22 of FIG. 1, is generally described at 100 in accordance with aspects of the present disclosure. Some or all of the operations illustrated in FIG. 2 and described in further detail below can be representative of an algorithm that corresponds to processor-executable instructions that may be stored, for example, in main or auxiliary or remote memory, and executed, for example, by an onboard or remote ECU, central processing unit (CPU), control logic circuit, or other module or device, to perform any or all of the above and/or below described functions associated with the disclosed concepts. It should also be recognized that the order of execution of the illustrated operation blocks may be changed, additional blocks may be added, and/or some of the blocks described may be modified, eliminated, or combined.

Method 100 begins at terminal block 101 by initiating a synchronization protocol to establish a secure and encrypted wireless communications link between two proximal devices. For instance, method 100 provides processor-executable operations to detect, recognize and sync a third party's off-board NFC-enabled device with the vehicle's onboard NFC-enabled device. By way of non-limiting example, when method 100 begins, there is no wired or wireless communication between the vehicle 10 and device 20. Correspondingly, any related feature application on the device 20 is likely asleep or not running; however, backend operations, such as push notifications, location tracking, and/or compatible device detection, may remain active. At decision block 103, the vehicle 10—specifically ECU 42 of HMI 18 through collaborative operation with NFC tag 37—monitors for and detects the presence of an NFC-enabled device. If the NFC-enabled component 24 of device 20 of FIG. 1 is held, waved or passed within a predetermined proximity of the NFC tag 37 of HMI 18, a device is detected (Block 103=YES). If an NFC-enabled device is not detected (Block 103=NO), all related network services may be concomitantly disabled by the ECU 42, whereas the process returns to block 101 and continues to monitor with no NFC network connection.

Some heterogeneous device types may incorporate an NFC-interfacing property, e.g., operable through a TagTech object or an NfcA, NfcB, NfcF, IsoDep, Ndef, etc., object, that is selectively activated or deactivated to enable/disable NFC communications operability. For instance, an NfcA object provides access to NFC-A (ISO 14443-3A) properties and I/O operations on an NFC tag, i.e., the primary NFC-A I/O operation being to transceive data. Thus, brokering a wireless communications session may first require that the NFC-interfacing property be activated. If the off-board device's NFC-interfacing property is in fact disabled, a detectable signal is not being emitted by the third-party device and, thus, no device is detected (Block 103=NO). If, however, the NFC-enabled components of the onboard and off-board electronic devices are within the predetermined proximity of each other (Block 103=YES), a wireless communications session between the onboard and off-board electronic devices is created at process block 105. In so doing, a two-way NFC communication link is established between the mobile device 20 and the vehicle 10 via the interfacing NFC components. Maintaining an uninterrupted, continuous communications session between the vehicle 10 and device 20 may necessitate periodically testing the NFC communications channel and the status of the third-party device (e.g., proximity and activation status). Optionally, the communication link could be automatically terminated after a predetermined period of time.

When an off-board NFC-enabled device is detected and attempting to sync, the vehicle communications system may wish to prevent any unauthorized transfer of data to or from the vehicle 10. At decision block 107, method 100 determines if the NFC-enabled device is authorized to communicate with the vehicle, the vehicle's owner or a vehicle occupant. Authorization may merely require that a compatible mobile software application be present on the device 20, or it may require that the device 20 or user of the device be registered as an approved guest/guest mobile device for the particular vehicle 10, or a combination of both. Registration may necessitate completion of an authentication process through an internet-based web portal before access is granted. Optionally, an off-board device may be authenticated via automated or manual submission of a password or pin during the sync process. The authorization check at decision block 107 helps to preclude an unrecognized and/or unsanctioned device from establishing NFC communications with the vehicle 10. Prior to, contemporaneous with, or after establishing a wireless communications session, for example, ECU 42 of motor vehicle 10 may decide whether or not to grant the off-board electronic device 20 access to the NFC tag 37 in the NFC-enabled component 36. If an unauthorized device is detected (Block 107=NO), access is denied, network services may be contemporaneously disabled, and the process returns to block 101.

Once the vehicle's communication system detects, syncs and authenticates a proximal third-party device, access to the contents of the NFC tag and onboard device may be granted and data exchange may commence. In accord with an example, the vehicle's NFC tag, which may be write-locked and passive, is pre-programmed with a unique web URL assigned to the host-vehicle. A web page associated with the unique web URL includes one or more user features for communicating with an owner, driver or occupant of the vehicle, such as a web application with a text box of other fillable field operable for entering and sending a text-based message. Embedded JavaScript may be implemented to generate additional or alternative tools for communicating with a party associated with the vehicle, including web applications for sending audio files, video files, pictures, secure/encrypted data, money, etc. When access to the NFC tag 37 is granted to the off-board electronic device 20 (Block 107=YES), the unique web URL is read off the tag 37 by the off-board electronic device 20 or otherwise transmitted from the NFC tag 37 to the NFC-enabled component 24 at process block 109. When communicating the unique web URL, the tag 37 may concurrently transmit an embedded command prompt for the device 20 to automatically open the unique web URL in a web browser application on the off-board electronic device. Rather than automate the URL call, the system may contemporaneously transmit an audible or visual prompt to a user of the off-board electronic device to open the unique web URL in a resident web browser application.

Having granted the off-board electronic device access to the NFC tag at block 107, and concomitantly transmitted vehicle-specific content stored by the NFC tag to the off-board device at block 109, the method 100 continues to block 111 with communicating a message data packet from the off-board electronic device to the onboard electronic device or to a personal computing device of a user associated with the vehicle. This data packet payload may comprise any logically applicable content, such as text, audio, video, control information, source and destination information, etc. Continuing with the above example, the unique web URL may direct a user of the off-board device 20 to a webpage with a web application that presents fillable fields for the user to type a message to the vehicle owner. The vehicle controller 42 may receive this message file and command the wireless communications HMI 18 of the motor vehicle 10 to display, broadcast, or otherwise output the message file to an occupant of the motor vehicle. Alternatively, process block 111 may require the message file be transmitted to a smartphone, tablet computer, desk-top computer or other personal computing device of a user of the motor vehicle. If so desired, this method allows for both the vehicle owner and the bystander to remain unidentified. Different types of data may be conveyed to the vehicle/vehicle owner, including social-networking type information (e.g., "like" a car; share a common interest; provide personal contact information for dating or friendship, etc.), carshare or rideshare information (e.g., for hourly, daily, or long-term car rental; carpool; transit, etc.); alert information (e.g., potential parking violation; vehicle windows open and expected to rain; vehicle lights on; suspicious activity near vehicle, etc.); vehicle identification information (e.g., for police enforcement use; towing; child/animal in vehicle on hot day, etc.).

Figure 3:
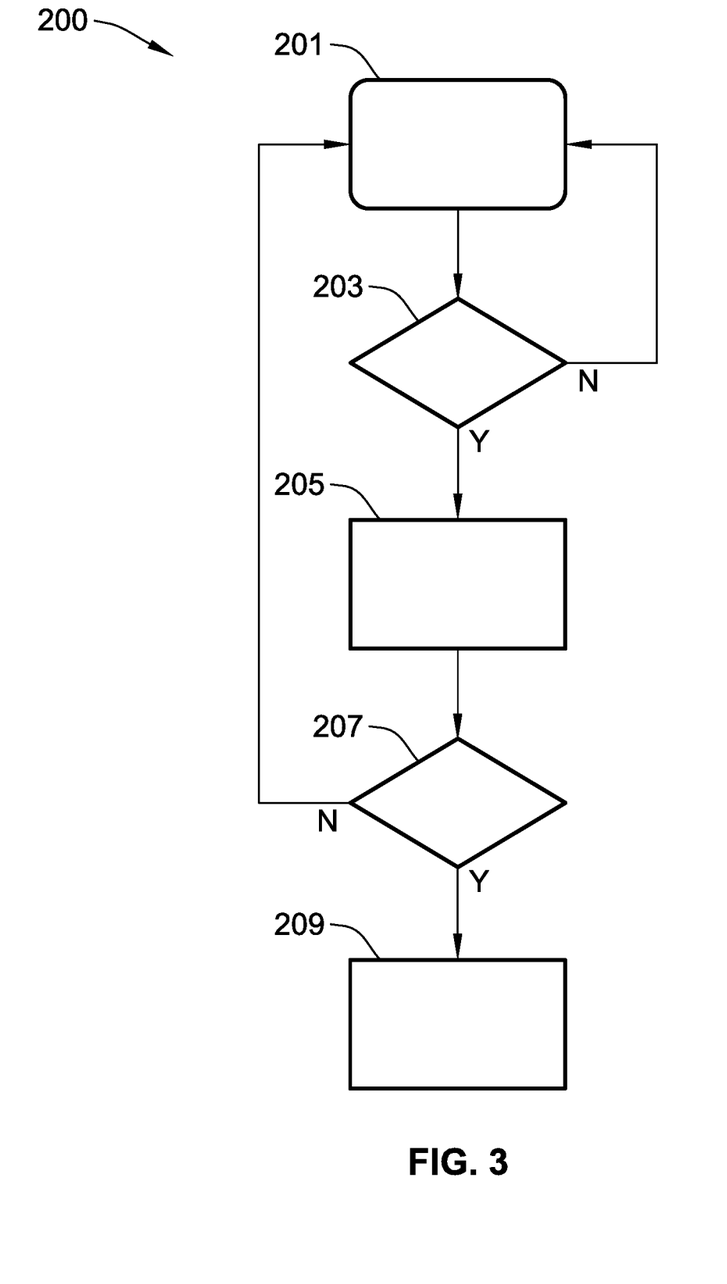
FIG. 3 is a flowchart for a representative NFC notepad communications protocol or algorithm that may correspond to memory-stored instructions executed by onboard control-logic circuitry, programmable electronic control unit, or other computer-based device of a motor vehicle in accord with aspects of the disclosed concepts.

FIG. 3 presents another method or control strategy for provisioning data exchange between an NFC-enabled onboard electronic device, such as HMI 18 of FIG. 1, and an NFC-enabled off-board electronic device, such as portable electronic device 20 of FIG. 1, is generally described at 200 in accordance with aspects of the present disclosure. Some or all of the operations illustrated in FIG. 3 and described in further detail below can be representative of an algorithm that corresponds to processor-executable instructions that may be stored, for example, in main or auxiliary or remote memory, and executed, for example, by an on-board or remote ECU, central processing unit (CPU), control logic circuit, or other module or device, to perform any or all of the above and/or below described functions associated with the disclosed concepts. Like the flowchart of FIG. 2, the illustrated operation blocks of FIG. 3 may be reordered, supplemented, modified, eliminated, and/or combined.

Method 200 of FIG. 3 may include any of the features and functions disclosed above, for instance, with respect to FIG. 2. As an example, the method 200 begins at terminal block 201 by initiating a synchronization protocol to establish a secure and encrypted wireless communications link between two proximal devices. Likewise, at decision block 203, the vehicle 10 monitors for and detects the presence of an NFC-enabled device. As indicated above, the off-board electronic device 20 may come pre-installed with, or the user may independently download, a dedicated mobile software application for communicating with the vehicle 10. This mobile app may include a backend search module that is programmed to search for nearby compatible NFC tags. In this instance, the search module may detect and issue a prompt to interact with the NFC tag 37 of the onboard electronic; this prompt helps to establish a wireless communications session between the two devices.

If NFC-enabled interfaces are within proximity of each other such that NFC detection is accomplished (Block 203=YES), a wireless communications session between the onboard and off-board electronic devices is created at process block 205. After an off-board NFC-enabled device is detected, the vehicle's communications system may wish to prevent the unauthorized transfer of data to or from the vehicle 10. At decision block 207, method 100 determines if the NFC-enabled device is authorized to communicate with the vehicle, the vehicle's owner or a vehicle occupant. By way of non-limiting example, the NFC tag 37 of FIG. 1 may be programmed with a read-write lock that restricts access to the contents of the tag. Granting access to the NFC tag 37 may involve transmitting an audible or visual prompt to the user of the off-board electronic device 20 requesting they enter an authorization code (e.g., pin, password, etc.) to deactivate the read-write lock. Rather than require the manual entry of the authorization code, the ECU 42, via NFC tag 37, may automatically read the authorization code from the device 20 to deactivate the read-write lock.

After detecting, syncing and authenticating the third-party device, access to the contents of the NFC tag and onboard device may be granted and data exchange may commence. When access to the NFC tag 37 is granted to the off-board electronic device 20 (Block 207=YES), the off-board electronic device may read, write or otherwise manipulate data stored by the vehicle 10. For instance, the device's 20 dedicated mobile app may be developed with a read-write module whereby the user can read a message stored by the NFC tag, clear one or more messages stored by the NFC tag, and/or write a message for storage by the NFC tag at process block 209. This methodology provides third party entities with a means to leave messages or other information on the vehicle's read/write tag. It may be desirable, for at least some applications, to isolate the NFC tag from the network of in-vehicle devices such that vehicle security is not compromised. This application allows vehicle owners to leave messages for others to read, and to check their car for messages by accessing the NFC tag, e.g., through the center stack HMI or a handheld smart device.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in other manners (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for provisioning data exchange between an onboard electronic device of a motor vehicle and an off-board electronic device external to the motor vehicle, the onboard and off-board electronic devices each including a respective Near Field Communication (NFC) enabled component, the method comprising:

detecting if the NFC-enabled components of the onboard and the off-board electronic devices are within a predetermined proximity of each other;

if the NFC-enabled components of the onboard and off-board electronic devices are within the predetermined proximity of each other, establishing a wireless communications session between the NFC-enabled components of the onboard and off-board electronic devices;

after establishing the wireless communications session, determining, via a vehicle controller of the motor vehicle, whether or not to grant the off-board electronic device access to an NFC tag in the NFC-enabled component of the onboard electronic device, the NFC tag including a unique web Uniform Resource Locator (URL) assigned to the motor vehicle;

responsive to a determination to grant the off-board electronic device access to the NFC tag, transmitting the unique web URL from the NFC tag to the NFC-enabled component of the off-board electronic device via the wireless communications session; and communicating a message data packet, with a data payload comprising content received from the off-board electronic device via a webpage associated with the unique web URL, to the onboard electronic device or to a computing device of an owner or occupant of the vehicle.

2. The method of claim 1, wherein the webpage associated with the unique web URL includes a web application with one or more tools operable by a user of the off-board electronic device to send an audio file, video file, picture, encrypted data, and/or money to the owner or occupant of the vehicle.

3. The method of claim 1, wherein transmitting the unique web URL includes contemporaneously transmitting an embedded command with instructions for the off-board electronic device to automatically open the unique web URL in a web browser application on the off-board electronic device.

4. The method of claim 1, wherein transmitting the unique web URL includes contemporaneously transmitting a prompt to a user of the off-board electronic device to open the unique web URL in a web browser application on the off-board electronic device.

5. The method of claim 1, wherein the webpage associated with the unique web URL includes a web application with a text box operable for entering and sending a message in the message data packet.

6. The method of claim 1, wherein the NFC-enabled component of the off-board electronic device includes an NFC-interfacing property with active and inactive states, the NFC-interfacing property being operable through a TagTech object, an NfcA object, an NfcB object, an NfcF object, an IsoDep object, and/or an Ndef object, and wherein establishing the wireless communications session is further in response to the NFC-interfacing property being active.

7. The method of claim 1, wherein the data payload of the message data packet includes a message file from a user of the off-board electronic device, and wherein communicating the message data packet includes the vehicle controller commanding a wireless communications human machine interface (HMI) of the motor vehicle to output the message file to an occupant of the motor vehicle.

8. The method of claim 1, wherein the data payload of the message data packet includes a message file from a user of the off-board electronic device, and wherein communicating the message data packet includes transmitting the message file to a smartphone of a user of the motor vehicle.

9. The method of claim 1 wherein the off-board electronic device includes a dedicated software application with a search module operable to search for nearby NFC tags, and wherein establishing the wireless communications session is further in response to a prompt from the search module to interact with the NFC tag of the onboard electronic device.

10. The method of claim 1, wherein the NFC tag includes a read-write lock operable to restrict access to the NFC tag, and wherein determining whether or not to grant the off-board electronic device access to the NFC tag includes transmitting a prompt to a user of the off-board electronic device to enter an authorization code to deactivate the read-write lock.

11. The method of claim 1, wherein the NFC tag includes a read-write lock operable to restrict access to the NFC tag, and wherein determining whether or not to grant the off-board electronic device access to the NFC tag includes automatically reading from the off-board electronic device an authorization code to deactivate the read-write lock.

12. The method of claim 1, wherein the off-board electronic device includes a dedicated software application with a read-write module operable to read a message stored by the NFC tag, clear one or more messages stored by the NFC tag, and write a message for storage by the NFC tag.

13. A motor vehicle comprising:
a vehicle body;
an onboard electronic device attached to the vehicle body, the onboard electronic device including an NFC-enabled component with an NFC tag, the NFC-enabled component of the onboard electronic device being configured to detect and establish a wireless communication session with an NFC-enabled component of an off-board electronic device that is within a predetermined proximity of the NFC-enabled component of the onboard electronic device; and
a vehicle controller communicatively connected to the onboard electronic device, the vehicle controller being programmed to:
determine, after the wireless communications session is established, whether or not to grant the off-board electronic device access to data stored by the NFC tag in the NFC-enabled component of the onboard electronic device, the NFC tag including a unique web Uniform Resource Locator (URL) assigned to the motor vehicle;
responsive to a determination to grant the off-board electronic device access to the NFC tag, transmit the unique web URL from the NFC tag to the NFC-enabled component of the off-board electronic device via the wireless communications session; and
transmit to a user of the motor vehicle a message data packet with a data payload comprising content received from the off-board electronic device via a webpage associated with the unique web URL.

14. The motor vehicle of claim 13, wherein the webpage associated with the unique web URL includes a web application with one or more tools operable by a user of the off-board electronic device to send an audio file, video file, picture, encrypted data, and/or money to the owner or occupant of the vehicle.

15. The motor vehicle of claim 13, wherein transmitting the unique web URL includes contemporaneously transmitting an embedded command to automatically open the unique web URL in a web browser application on the off-board electronic device.

16. The motor vehicle of claim 13, wherein transmitting the unique web URL includes contemporaneously transmitting a prompt to a user of the off-board electronic device to open the unique web URL in a web browser application on the off-board electronic device.

17. The motor vehicle of claim 13, wherein the web page associated with the unique web URL includes a web application with a text box operable for entering and sending a message in the message data packet.

18. The motor vehicle of claim 13, wherein the data payload of the message data packet includes a message file from a user of the off-board electronic device, and wherein transmitting the message data packet includes the vehicle controller being further programmed to command a wireless communications human machine interface (HMI) of the motor vehicle to output the message file to an occupant of the motor vehicle.

19. The motor vehicle of claim 13, wherein the NFC tag includes a read-write lock operable to restrict access to the NFC tag, and wherein determining whether or not to grant the off-board electronic device access to the NFC tag includes transmitting a prompt to a user of the off-board electronic device to enter an authorization code to deactivate the read-write lock.

20. The motor vehicle of claim 13, wherein the NFC tag includes a read-write lock operable to restrict access to the NFC tag, and wherein determining whether or not to grant the off-board electronic device access to the NFC tag includes automatically reading from the off-board electronic device an authorization code to deactivate the read-write lock.

* * * * *